Figure 1:
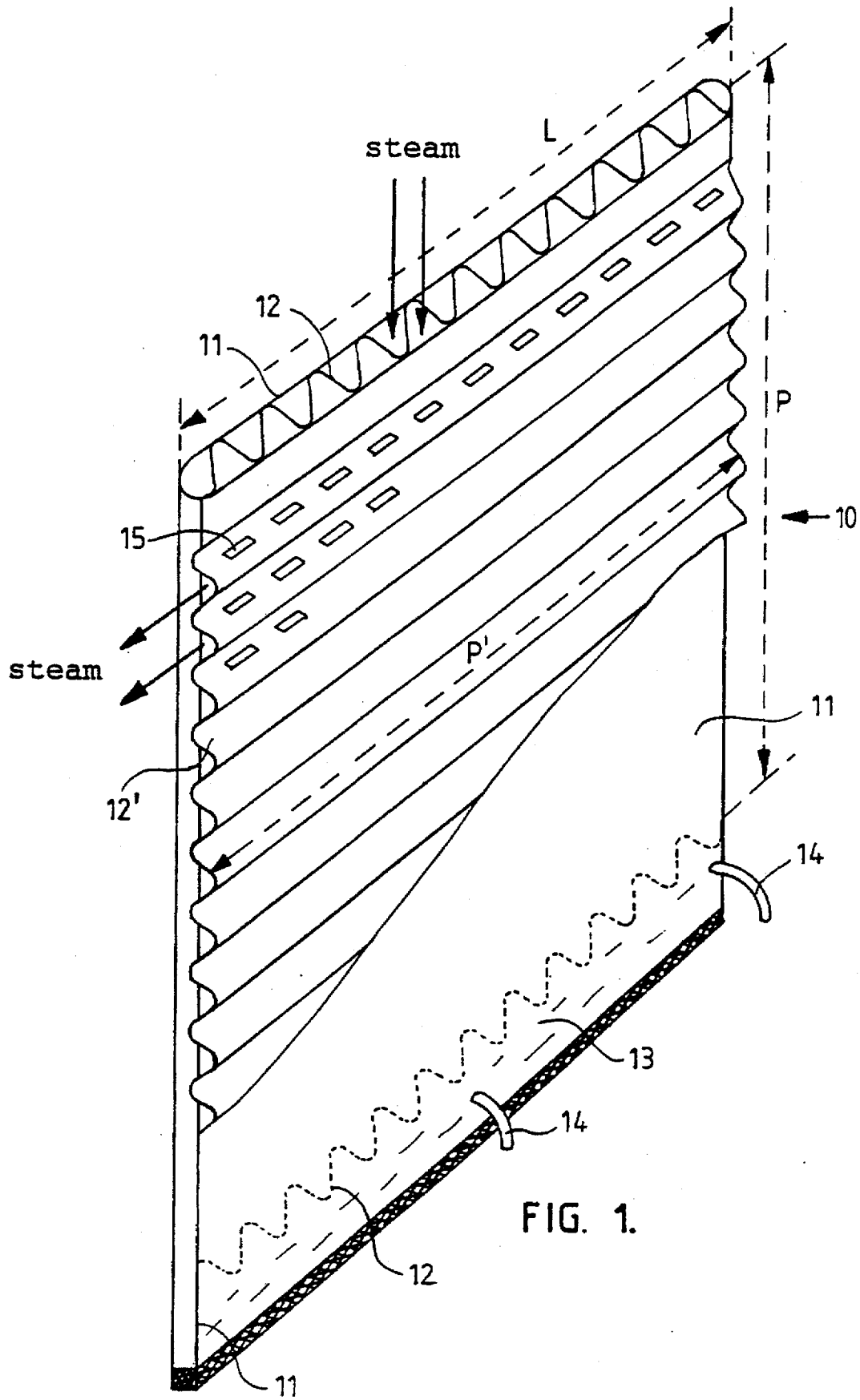

United States Patent [19]
Kordelin

[11] Patent Number: 5,671,804
[45] Date of Patent: Sep. 30, 1997

[54] HEAT EXCHANGER ELEMENT

[75] Inventor: Tapio Kordelin, Turku, Finland

[73] Assignee: Oy Shippax Ltd., Turku, Finland

[21] Appl. No.: 693,299

[22] PCT Filed: Feb. 6, 1995

[86] PCT No.: PCT/FI95/00051

§ 371 Date: Aug. 16, 1996

§ 102(e) Date: Aug. 16, 1996

[87] PCT Pub. No.: WO95/24251

PCT Pub. Date: Sep. 14, 1995

[30] Foreign Application Priority Data

Mar. 9, 1994 [FI] Finland ................... 941100

[51] Int. Cl.$^6$ ................ F28D 5/02; F28D 3/00
[52] U.S. Cl. .................. 165/46; 165/115; 165/166; 165/DIG. 163; 165/DIG. 183; 165/DIG. 185
[58] Field of Search ................ 165/46, 115, 111, 165/166

[56] References Cited

U.S. PATENT DOCUMENTS

| | | |
|---|---|---|
| 3,256,930 | 6/1966 | Norback ................... 165/46 |
| 4,216,820 | 8/1980 | Andrew . |
| 4,424,098 | 1/1984 | Hartig . |
| 4,585,523 | 4/1986 | Giddings . |
| 4,842,049 | 6/1989 | Dodds ................... 165/46 |
| 5,340,443 | 8/1994 | Heiniö et al. . |

FOREIGN PATENT DOCUMENTS

| | | | |
|---|---|---|---|
| 58-148391 | 9/1983 | Japan | ................... 165/46 |
| 82/01938 | 6/1982 | WIPO . | |
| 90/13785 | 11/1990 | WIPO . | |
| 92/10265 | 6/1992 | WIPO . | |

*Primary Examiner*—Allen J. Flanigan
*Attorney, Agent, or Firm*—Burns, Doane, Swecker & Mathis, L.L.P.

[57] ABSTRACT

The invention relates to a heat exchanger element (10) comprising a bag formed from a compliant material like plastic sheet (11). The lower part of the bag ends to a condensate receiver (13), which is provided with a drain pipe (14) for the condensate. The upper part of the bag has means for introducing the vapour into the bag and distributing the liquid to be evaporated onto the outer surface of the bag. It is characteristic that inside the bag a perforated corrugated plate (12) is fitted in vertical direction with its width (L) chosen so that the bag tightens suitably around the corrugated plate. The length (P) of the corrugated plate (12) corresponds to a major portion of the length of the bag. A perforated corrugated plate (12') is fitted in horizontal direction against the outer surface of the bag with its length (P') substantially corresponding to the width of the bag.

12 Claims, 2 Drawing Sheets

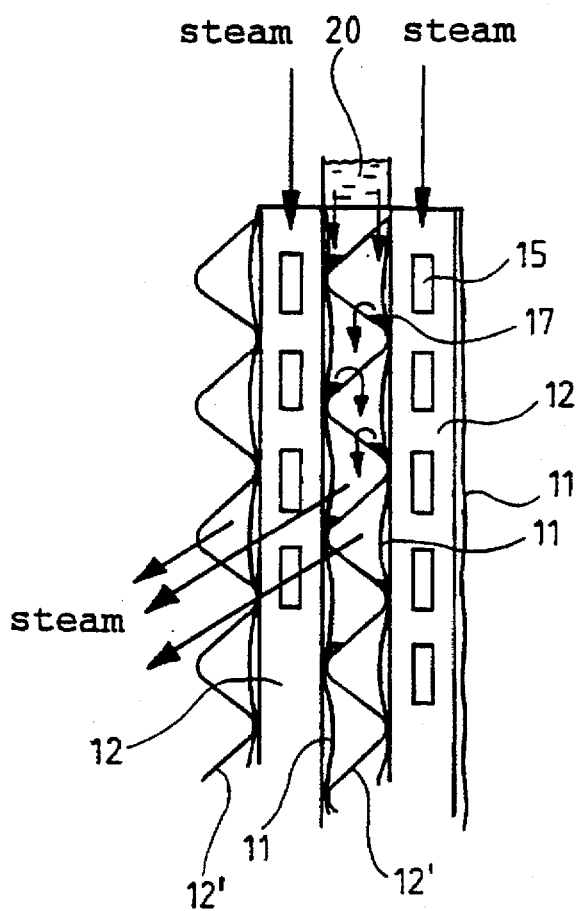
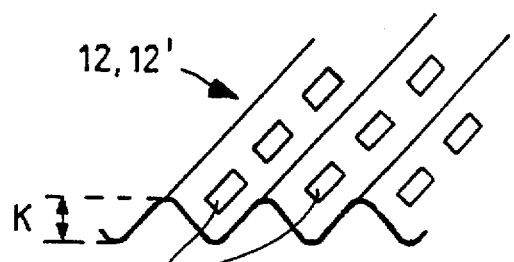
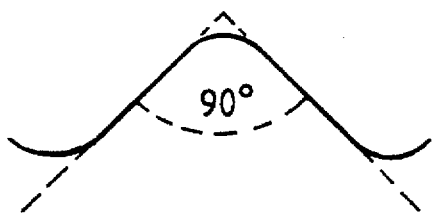
FIG. 2
FIG. 3
FIG. 4

HEAT EXCHANGER ELEMENT

The invention relates to a heat exchanger element for a film heat exchanger and a film heat exchanger constructed on the basis of this element.

The film heat exchanger presented in this description is particularly suitable for use in such heat exchanging situations where condensation of the vapour component into liquid takes place on one side of the heat exchanging surface and evaporation of the liquid component into vapour takes place on the other side of the heat surface. Heat exchangers of this type can be used e.g. in thermo-compressor evaporators and in a conventional evaporator plant which uses live steam as the source of energy.

The above film heat exchangers are particularly suitable for use in a film evaporator or distillation apparatus operating in the thermo-compressor principle. This is an apparatus where the heat exchanger unit is formed of flat bag-like elements of thin sheet material like plastic sheet placed against each other. Heat transfer takes place from the vapour condensing inside the elements through the sheet to the evaporating liquid falling on the outer surfaces of the elements. The vapour, which is introduced into the elements and which releases heat upon condensing, is generated outside the elements and its pressure and temperature has been raised by a compressor before it is introduced into the elements.

The purpose of use of film distillation apparatuses is to obtain a distillation product of desired quality like production of fresh water from sea water or purification of industrial process water before leading back to the process or to drain. Another purpose might be evaporation of excess solvent from various solutions or suspensions for obtaining a desired concentrate.

Patent publications FI 79948 and FI 86961 describe a heat exchanger suitable for a film distillation apparatus where the heat surfaces are thin plastic sheet. The plastic sheets are formed into vertical bag structures arranged adjacently. The liquid to be evaporated is led to fall from the top downwards along the outer surfaces of the bags whereupon part of it is evaporated. The pressure of the evaporated vapour and accordingly the condensation temperature is raised by a compressor after which it is introduced into the bag structures. Condensing of the vapour takes place there and the distillate or condensate obtained is discharged from the bottom of the bag. Inside the bag structure there are gorges obtained by welding the sheets together by point welds or by welding the sheets together by broken zigzag seams. The solution of the publication 86961 is provided with an end lath with a honeycomb structure at the top of the bag structure from which the liquid to be evaporated is introduced onto the outer surface of the bag structure. The end lath also comprises channels through which the vapour going into the bag structure is introduced.

The heat exchanger presented above, however, involves some points of risk. The plastic sheets may break at the welding points or at the seams since welding has changed the composition of the plastic material at these points. During operation the bags flutter due to formation of vapour and the sheets of two adjacent bags often stick together within a considerable area. When the bags come loose from each other, they readily stick at another point. This kind of continuous fluttering and sticking may lead to breaking of the plastic sheet and above all to lowering of the efficiency of the apparatus because a significant part of the heat surface is continuously out of use due to sticking. Furthermore, distribution of the liquid to be evaporated onto the outer surface of the bag is uneven because the liquid streams from the top tend to unite leaving part of the surface dry and the united liquid streams on the other hand are too fast-flowing to effect maximum evaporation. This uneven distribution of liquid leads to lowering of efficiency.

For the reasons mentioned above heat transfer is fairly low with respect to the area of the heat surfaces because approximately 40–50% of the heat surface is continuously out of use. To ensure a certain heat transfer efficiency, an excessively large heat surface must be constructed and this often leads to large and expensive apparatuses.

The objective of this invention is to remove the above problems and obtain an improved heat exchanger element without these drawbacks.

The invention relates to a heat exchanger element comprising a bag formed from a compliant material like plastic sheet. The lower part of the bag ends to a condensate receiver, which is provided with a drain pipe for the condensate. The upper part of the bag has means for introducing the vapour into the bag and distributing the liquid to be evaporated onto the outer surface of the bag. According to the invention, a corrugated plate with perforations is fitted or oriented in vertical direction inside the bag with its width chosen so that the bag tightens suitably around the corrugated plate and its length corresponding to a major portion of the length of the bag. Furthermore, a perforated corrugated plate is fitted or oriented in horizontal direction against the outer surface of the bag with its length substantially corresponding to the width of the bag.

The invention also relates to a film heat exchanger constructed on the basis of above heat exchanger elements wherein the heat exchanger elements are fitted adjacently so that the bag-like part of the first element contacts with the perforated corrugated plate, placed in horizontal direction, of the next element. Thus a structure is formed in which there is a corrugated plate with perforations placed in horizontal direction between each bag-like part.

The invention makes it possible to obtain a very stable and durable heat exchanger wherein the bags cannot move. This feature as well as the abandonment of seam welding are reasons why the risk of damage of the plastic sheet has significantly diminished. The bags cannot stick together and distribution of the liquid to be evaporated on the surface of the bag has become even. For these reasons the existing heat surface can be utilized in a much more effective way i.e. a certain heat transfer efficiency is attained with a definitely smaller heat surface than in conventional film heat exchangers. Due to this fact and the compact structure of the heat exchange element the space requirement is considerably reduced.

The invention is described in the following referring to the enclosed drawings in which FIG. 1 shows the structure of a heat exchanger element according to the invention as a perspective view, FIG. 2 shows a detail of the corrugated plate of the heat exchanger element of FIG. 1, FIG. 3 shows another detail of the corrugated plate of the heat exchanger element of FIG. 1, FIG. 4 shows two heat exchanger elements placed adjacently as a cross-section seen from the side.

FIG. 1 shows a heat exchanger element 10 placed in vertical direction comprising a bag formed from a plastic sheet 11. A corrugated plate 12 is fitted vertically into the bag. Vapour flows from the distribution device (the distribution device is not shown in the figure) from the top downwards into the bag on both sides of the corrugated plate 12 as indicated by the arrows. The vapour condensates as it passes downwards in the bag and the lower part of the bag forms a condensate receiver 13 which is provided with a drain pipe 14 for the condensate of which there can be one or more. The width L of the corrugated plate has been chosen so that the bag suitably tightens around it keeping the plastic sheet in place. The length P of the corrugated plate 12 corresponds to a major part of the length of the bag but preferably ends at slightly above the bottom so that a uniform condensate receiver 13 is formed. The corrugated plate 12 is provided with perforations 15 as shown in FIG. 2. However, it is important that the perforations do not extend up to the crest nor the bottom of the corrugations because these areas, which press against the plastic sheet, may cause damaging of the sheet. Due to the perforations 15 vapour can distribute evenly in the direction of width of the bag. The width L of the corrugated plate 12 is considerably large in comparison with the height K of the corrugation in order to get a bag which is suitably flat in terms of the heat transfer. On the other hand, very small height of the corrugation leads to narrow flow channels and high flow resistance. In practice, a height of corrugation of 5–10 mm is probably suitable for most uses. The corrugations are relatively sharp so that their profile forms an angle of about 90° (FIG.3). The corrugated plate can be made from a plastic with a proper rigidity or aluminium but also other materials are possible.

Fitted against the outer surface of the plastic bag, there is a perforated corrugated plate 12' placed in horizontal direction, the length P' substantially corresponding to the width of the bag. The height of corrugation of the corrugated plate 12', the profile of the corrugation and the manufacturing material of the corrugated plate 12' can be the same or different from those of the corrugated plate 12 described above.

FIG. 4 shows two adjacent heat exchanger elements as a cross-section seen from the side. The liquid to be evaporated flows down from a basin 20 along the outer surfaces of the sheets 11 of the plastic bags. During the run, the surfaces of the bags slightly bulge, due to the vapour pressure, towards the corrugated plate 12' placed horizontally. The liquid flowing down collects in pockets 17 formed by the corrugated plate and the sheet until they get filled, whereafter an overflow takes place through perforations 15 (the perforations 15 of the corrugated plate 12' are not visible) as indicated by the arrows. At the crest and bottom of each corrugation a redistribution of liquid takes place thereby giving a very even distribution of liquid in the direction of the width of the bag. The vapour formed can freely release in the lateral direction. In case the heat exchanger elements 10 are part of a heat exchanger of a thermo-compressor evaporator, the vapour released is then introduced into the compressor in which its pressure and accordingly its condensing temperature is raised. The vapour from the compressor is then led into the bags.

In a heat exchanger, the heat exchanger elements 10 are fitted adjacently so that the bag-like part of the first element contacts with the horizontally placed perforated corrugated plate of the next element. Thus a compact package is formed wherein a perforated corrugated plate placed in horizontal direction is located between each bag-like part.

The corrugations of the corrugated plate 12' need not be quite horizontal. The corrugations can run slightly obliquely so that the crests of corrugations tilt downwards from the edges to the centre of the bag.

It is obvious to a specialist in the field that various embodiments of the invention can vary within the limits of the enclosed claims.

I claim:
1. Heat exchanger element comprising
   a bag having an outer surface and formed from a compliant material with its lower part ending in a condensate receiver, which is provided with a drain pipe for condensate, and its upper part having means for introducing vapour into the bag and distributing the liquid to be evaporated onto the outer surface of the bag,
   a corrugated plate with perforations oriented in a substantially vertical direction inside the bag with its width chosen so that the bag tightens suitably around the corrugated plate and its length corresponds to a major portion of the length of the bag, and
   a perforated corrugated plate oriented in a substantially horizontal direction against the outer surface of the bag with its length substantially corresponding to the width of the bag.
2. Heat exchanger element as claimed in claim 1, wherein the width of the corrugated plate is considerably large compared to the height of the corrugation.
3. Heat exchanger element as claimed in claim 1, wherein the perforations of the corrugated plates are positioned only in the area between the top and the bottom of the corrugation.
4. Heat exchanger element as claimed in claim 1, wherein the profile of the corrugations form an angle of about 90° and that the tops and bottoms of the corrugation are rounded.
5. Heat exchanger element as claimed in claim 1, wherein the corrugated plates are made of plastic or aluminum or other material of suitable rigidity.
6. Heat exchanger including adjacent heat exchanger elements, each heat exchanger element comprising
   a bag having an outer surface and formed from a compliant material with its lower part ending in a condensate receiver, which is provided with a drain pipe for the condensate, and its upper part having means for introducing vapour into the bag and distributing liquid to be evaporated onto the outer surface of the bag, wherein
   a corrugated plate with perforations oriented in a substantially vertical direction inside the bag with its width being chosen so that the bag tightens suitably around the corrugated plate and its length corresponds to a major portion of the length of the bag, and
   a perforated corrugated plate oriented in a substantially horizontal direction against the outer surface of the bag with its length substantially corresponding to the width of the bag, and
   the heat exchanger elements are fitted adjacently so that the bag of one heat exchanger element contacts the perforated corrugated plate, oriented in a substantially horizontal direction, of an adjacent heat exchanger element thereby forming a structure with a perforated corrugated plate oriented in a substantially horizontal direction between each bag.
7. Heat exchanger element as claimed in claim 2, wherein the perforations of the corrugated plates are positioned only in the area between the top and the bottom of the corrugation.
8. Heat exchanger element as claimed in claim 2, wherein the profile of the corrugations form an angle of about 90° and that the tops and bottoms of the corrugation are rounded.
9. Heat exchanger element as claimed in claim 3, wherein the profile of the corrugations form an angle of about 90° and that the tops and bottoms of the corrugation are rounded.

10. Heat exchanger element as claimed in claim 2, wherein the corrugated plates are made of plastic or aluminum or other material of suitable rigidity.

11. Heat exchanger element as claimed in claim 3, wherein the corrugated plates are made of plastic or aluminum or other material of suitable rigidity.

12. Heat exchanger element as claimed in claim 4, wherein the corrugated plates are made of plastic or aluminum or other material of suitable rigidity.

* * * * *